US012752267B2

(12) United States Patent
Nielsen et al.

(10) Patent No.: US 12,752,267 B2
(45) Date of Patent: Oct. 6, 2026

(54) MONOLITHIC CARRIER STRUCTURE INCLUDING FLUID ROUTING FOR DIGITAL DISPENSING

(71) Applicant: HEWLETT-PACKARD DEVELOPMENT COMPANY, L.P., Spring, TX (US)

(72) Inventors: Jeffrey A. Nielsen, Corvallis, OR (US); Michael W. Cumbie, Corvallis, OR (US); Devin Alexander Mourey, Corvallis, OR (US); Silam J. Choy, Corvallis, OR (US); Kenneth Ward, Corvallis, OR (US); Christie Dudenhoefer, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1155 days.

(21) Appl. No.: 17/836,005

(22) Filed: Jun. 9, 2022

(65) Prior Publication Data

US 2022/0297113 A1 Sep. 22, 2022

Related U.S. Application Data

(63) Continuation of application No. 16/085,253, filed as application No. PCT/US2016/025317 on Mar. 31, 2016, now Pat. No. 11,383,230.

(51) Int. Cl.
*B01L 3/02* (2006.01)

(52) U.S. Cl.
CPC ....... *B01L 3/0268* (2013.01); *B01L 2200/021* (2013.01); *B01L 2200/12* (2013.01); *B01L 2300/0816* (2013.01); *B01L 2300/0864* (2013.01); *B01L 2300/0893* (2013.01); *B01L 2400/0439* (2013.01); *B01L 2400/0442* (2013.01)

(58) Field of Classification Search
None
See application file for complete search history.

(56) References Cited

U.S. PATENT DOCUMENTS

| | | | |
|---|---|---|---|
| 5,686,224 | A | 11/1997 | O'Neill |
| 6,155,666 | A | 12/2000 | Sugimoto et al. |

(Continued)

FOREIGN PATENT DOCUMENTS

| | | |
|---|---|---|
| CN | 101266255 | 9/2008 |
| CN | 102455332 | 5/2012 |

(Continued)

OTHER PUBLICATIONS

EcoTank WorkForce ET-4550, Oct. 19, 2015. Available at: <https://www.epson.com.au/shoponline/shop/DisplayProduct.asp?ID=1910&Store=Promo>.

*Primary Examiner* — Brittany I Fisher
(74) *Attorney, Agent, or Firm* — Foley & Lardner LLP

(57) ABSTRACT

A method of manufacturing a digital dispense apparatus includes molding a monolithic carrier structure, forming cut outs into a planar top surface of the monolithic carrier structure, the cut outs including a reservoir extending into part of a thickness of the monolithic carrier structure and fluid routing to connect the reservoir with a fluid dispense device, and overmolding the fluid dispense device into the monolithic carrier structure on a side of the monolithic carrier structure that is opposite to the reservoir to fluidically connect to the fluid routing.

13 Claims, 6 Drawing Sheets

(56) References Cited

U.S. PATENT DOCUMENTS

| | | | |
|---|---|---|---|
| 6,450,631 | B1 | 9/2002 | Hayashi et al. |
| 6,474,566 | B1 | 11/2002 | Hirota et al. |
| 8,205,978 | B2 | 6/2012 | Shimizu |
| 2002/0122748 | A1 | 9/2002 | Hirota et al. |
| 2002/0175220 | A1 | 11/2002 | Pence |
| 2003/0086828 | A1 | 5/2003 | Chiou et al. |
| 2003/0224395 | A1 | 12/2003 | Jovanovich |
| 2009/0047440 | A1 | 2/2009 | Giri et al. |
| 2010/0019408 | A1* | 1/2010 | Kawai .............. B01L 3/502715 425/185 |
| 2010/0304496 | A1 | 12/2010 | Nielsen et al. |
| 2012/0051984 | A1 | 3/2012 | Dudenhoefer et al. |
| 2012/0176447 | A1 | 7/2012 | Otokita |
| 2014/0055528 | A1 | 2/2014 | Bibl |
| 2014/0193309 | A1 | 7/2014 | Still |
| 2014/0297029 | A1 | 10/2014 | Peters |
| 2014/0314954 | A1 | 10/2014 | Lewis et al. |
| 2016/0001552 | A1 | 1/2016 | Chen et al. |
| 2016/0009084 | A1 | 1/2016 | Chen |

FOREIGN PATENT DOCUMENTS

| | | | |
|---|---|---|---|
| CN | 103119450 | | 5/2013 |
| CN | 104661737 | | 5/2015 |
| EP | 2818873 | | 12/2014 |
| JP | 2004077490 | | 3/2004 |
| JP | 2013068612 | | 4/2013 |
| TW | 200741202 | A | 11/2007 |
| WO | WO-0196019 | | 12/2001 |
| WO | WO-2009126945 | | 10/2009 |
| WO | WO-2015041665 | | 3/2015 |
| WO | WO-2015080730 | | 6/2015 |

* cited by examiner 331
311
325

311
311
331
325

331
325

311
311
309
329

309
329

309
329

329

A
P
A
309

MONOLITHIC CARRIER STRUCTURE INCLUDING FLUID ROUTING FOR DIGITAL DISPENSING

CROSS-REFERENCE TO RELATED APPLICATIONS

This application is a Continuation of U.S. application Ser. No. 16/085,253, filed Sep. 14, 2018, which is a U.S. National Stage Application of International Application No. PCT/US2016/025317, filed Mar. 31, 2016, each of which is incorporated herein by reference.

BACKGROUND

In the field of titration, digital titration is replacing manual or analogue titration because of its efficiency and precision. High precision digital titration apparatuses include replaceable, digital titration cassettes that are to be placed and replaced in a digital dispense host apparatus.

Digital titration cassettes are provided with a row of fluid dispense dies on a bottom side and an equal number of reservoirs on a top side. The fluid dispense dies can be discrete MEMSs (Micro-Electro-Mechanical Systems), wherein each die dispenses drops of between 11 pico-liters and 10 microliters in volume. The reservoirs are open at the top to receive fluid, for example from a pipette, and may have a narrower opening at the bottom to deliver the fluid to respective fluid dispensers at the bottom.

In operation, the dispensing dies dispense the fluid drops in wells of a well plate, e.g. micro- or multi-well plate, positioned below the cassette. For example each well may contain reagent for later analysis wherein the reagent components are at least partially determined by the digital titration host apparatus. Typically a digital titration host apparatus holds the cassette and the well plate. The host apparatus controls fluid ejection from the dies, to eject fluid into the wells. The host apparatus may properly position the cassette with respect to the well plate to dispense desired quantities of fluid in each predetermined well of the plate, for example by moving the dispensing cassette and well plate with respect to each other after each dispense action.

DRAWINGS

DESCRIPTION

Figure 1:
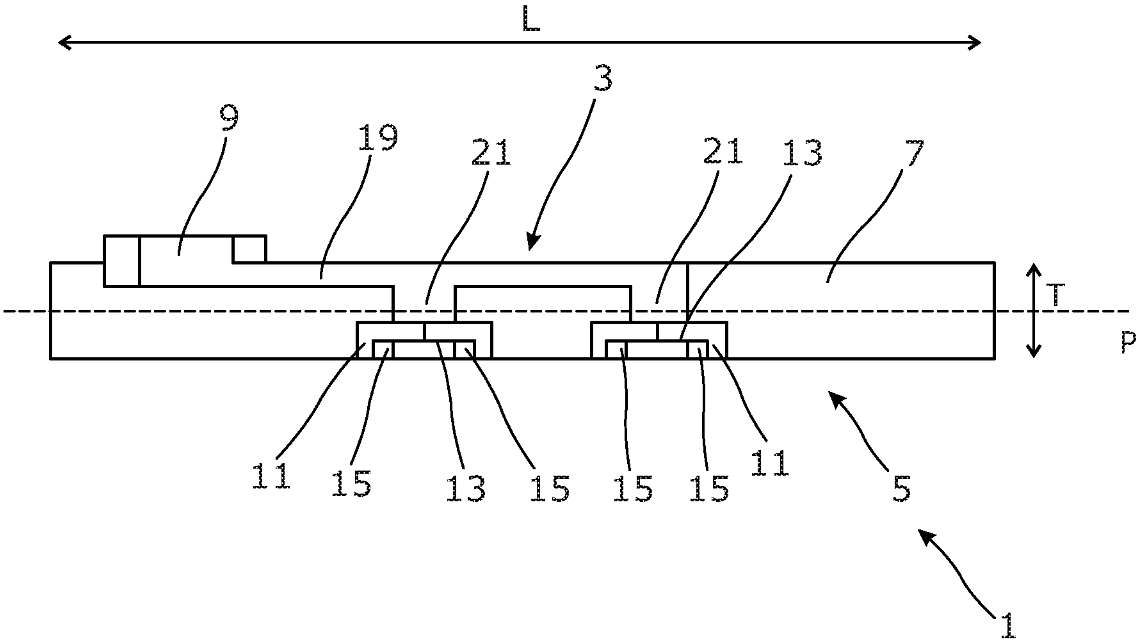
FIG. 1 illustrates a diagram of a cross sectional front view of an example dispense apparatus.

FIG. 1 illustrates an example of a digital dispense apparatus 1 in a diagrammatic cross sectional front view. In one example the digital dispense apparatus 1 is a digital titration cassette. The digital titration cassette may be intended for insertion into a digital titration host apparatus, and for replacement by another cassette after usage. The digital titration cassette may dispense fluids into micro- or multi-well plates or the like that extend below the digital titration cassette during dispensing, for receiving the fluids. In an example, the well plates are to hold separate reagents of similar or different compositions in separate containers. In different examples the wells are to hold several picoliters to several microliters of fluid. Although one example of the digital dispense apparatus is a digital titration cassette that includes digitally actuable fluid dispense devices, the principles described in this disclosure may also apply to other application areas that involve high precision, digitally driven, fluid dispensing.

The illustrated dispense apparatus 1 has a top side 3 and a bottom side 5. Although this disclosure refers to "top" and "bottom", these words should be considered as relative to each other. The dispense apparatus 1 can have any orientation, wherein what is called a top side may in practice extend on a bottom and vice versa. In one example, the top and bottom refer to orientation of the apparatus 1 during dispensing.

The digital dispense apparatus 1 includes at least one monolithic carrier structure 7. The carrier structure 7 is cast as a single piece. Example materials of the monolithic carrier structures 7 include epoxy mold compound, glass, FR4, or any suitable molded plastics.

The digital dispense apparatus 1 may be of a generally planar shape. In this disclosure, planar may refer to a thickness T of at least three times less than a length L or width (the width extending into the page) of the apparatus 1, or at least five times less its length L or width. A length L and width of the carrier structure 7 may extend along a virtual, central plane P of the carrier structure 7, wherein the plane P extends through the thickness T of the carrier structure 7. In the example, the monolithic carrier structure 7 is generally planar and extends generally parallel to the plane P.

The cassette 1 includes fluid dispense devices 11 to dispense fluid. The cassette 1 includes a reservoir 9 and fluid routing 19 to receive and route fluid to the fluid dispense devices 11. In the examples of this disclosure the reservoirs 9 and fluid routing 19 are formed by the monolithic carrier structure 7. The reservoir 9 is to receive fluid from an external source such as a pipette. The fluid routing 19 is to deliver that fluid to at least one fluid dispense device 11 downstream of the reservoir 9.

The reservoir 9 may extend at the top side 3 of the carrier structure 7. The reservoir 9 can be pre-molded cut outs in the carrier structure 7 or separately attached cups that fluidically connect to the fluid dispense devices 11. For example, the reservoirs 9 may be partly cup shaped, i.e. open at the top, to receive fluid, and also open to fluid routing 19 to deliver fluid towards the bottom side 5. The reservoir 9 may be wider at the top and have tapering or curving walls in a downwards direction. The fluid routing 19 may fluidically connect to fluid feed slots of the fluid dispense devices 11.

The carrier structure 7 carries fluid dispense devices 11 at its bottom side 5. Each fluid dispense device 11 may be provide with an array of drop generators 15 to dispense fluid drops into a well of a well plate. The fluid dispense devices 11 can be embedded in the carrier structure 7 or attached to it, either by direct adherence, or indirectly through another carrier structure. In one example the apparatus 1 includes at least one row and at least two columns of fluid dispense devices 11. An example dispense apparatus 1 has more columns than rows in the array of dispense devices 11. A length of a row may extend parallel to the length L of the apparatus 1. Each fluid dispense device 11 may include at least one feed slot and micro channels 13 downstream of the feed slot, in a fan out manner, to receive the fluid from the reservoirs 9 and guide the fluid towards nozzles.

Each fluid dispense device 11 may be part of a MEMS die. In one example each one fluid dispense device 11 is formed by one separate die. In another example, a single die includes a plurality of fluid dispense devices 11. The die 31 includes processed silicon and thin film layers. A fluid feed slot may extend through a silicon substrate of the die. Die construction may be similar to thermal or piezo inkjet printhead dies. Drop generators 15 and micro channels 13 may extend in the thin film layers. Drop generators 15 may include nozzle chambers, drop ejection actuators in the nozzle chambers, and nozzles. The nozzle chambers receive fluid from the microchannels. The actuators dispense the fluid out of the nozzle chamber through the nozzles. The nozzles extend through a nozzle plate of the fluid dispense device 11. The drop ejection actuators can be thermal resistors or piezo actuators. Each fluid dispense device 11 includes at least one drop generator array. Each fluid dispense device 11 may have any number of drop generators 15, varying from 1 to approximately 1000, for example. Example fluid dispense device 11 facilitates dispensing a single drop out of a single nozzle at a time, allowing for very low volumes of fluid to be ejected, for example a lowest drop volume of 11 picoliters or less, or for example lowest drop volume of between approximately 1 and 5 picoliters. In one example, individual drops as dispensed by the drop generators 15 may have volumes of between approximately 1 and 10 picoliters whereby multiple combined drops of one fluid dispense device 11 can dispense volumes of approximately 1 to approximately 1000 picoliters.

In one example, fluid routing 19 is provided to deliver the fluid from the reservoir 9 to the fluid dispense device 11. The fluid routing 19 may be open to the reservoir 9 on one end and open to the fluid ejection device 11 on the other end. In one example each reservoir 9 and associated fluid routing 19 are clearly recognizable as discrete fluid components while in another example the reservoir 9 and fluid routing 19 may form one integral shape for receiving and guiding fluid. The reservoir 9 and/or fluid routing 19 can be formed by surfaces of the monolithic carrier structure 7 whereby the monolithic carrier structure 7 itself guides contacts the fluid directly. For example, fluid routing 19 may be formed of a cut out in the top side 3 of the monolithic carrier structure 7. In the illustrated example the fluid routing 19 is slot shaped.

In one example, the fluid routing 19 is to deliver fluid from one reservoir 9 on the top side 3 to a plurality of fluid dispense devices 11 on the bottom side 5. For example the fluid routing 19 may branch off in a downstream direction to connect a single reservoir 9 to a plurality of fluid dispense devices 11. For example the fluid routing 19 may include a plurality of branches 21 that each deliver fluid from the one reservoir 9 to the fluid dispense device 11. In an example, each reservoir 9 and fluid routing 19 is to hold approximately 100 microliter or less, approximately 50 microliter or less or approximately 20 microliter or less, per individual fluid dispense device 11, in an operational position in the host apparatus, for delivery to the at least one fluid dispense device 11.

Providing fluid routing 19 in the monolithic carrier structure 7 allows for flexibility of the number of reservoirs 9 versus the number of fluid dispense devices. For example, denser arrays of dispense arrays can be fed from a less dense array of reservoirs or vice versa. In addition, providing for cut out fluid routing directly in the monolithic carrier structure 7 may provide for efficient manufacturing of the dispense apparatus 1. Also, the cassette can be customized for efficient dispensing for any type or size of well plate or well array.

Figure 2:
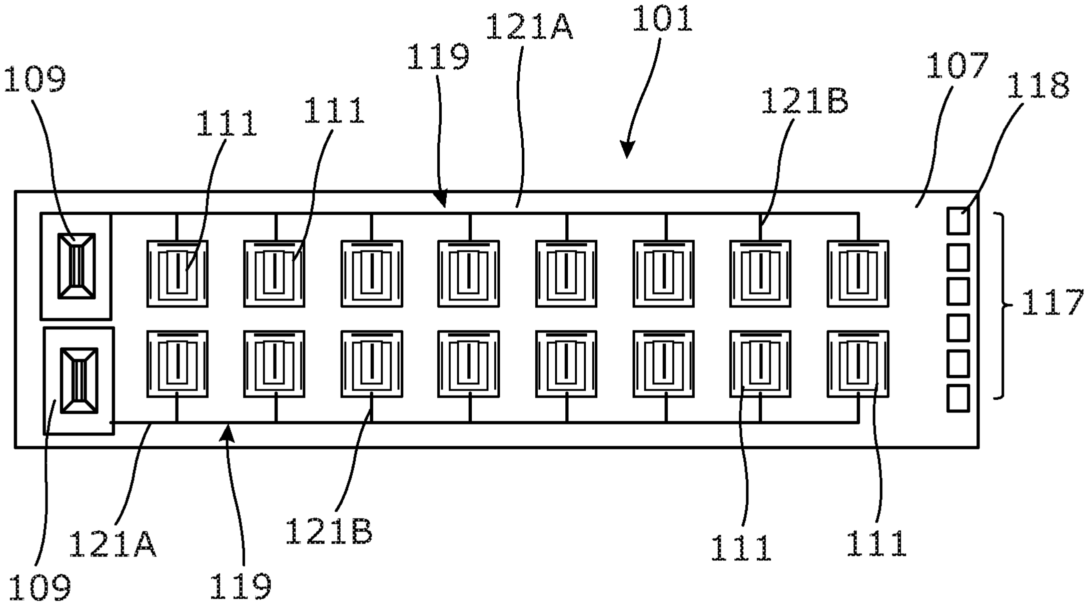
FIG. 2 illustrates a diagram of an example digital titration cassette.

FIG. 2 illustrates an example of a digital titration cassette 101. The digital titration cassette 101 includes two reservoirs 109 near an outer edge of the digital titration cassette 101. In the illustrated example, the reservoirs 109 are placed along a longitudinal edge of the cassette 101. The reservoirs 109 are provided in a monolithic carrier structure 107. The reservoirs 109 may be pre-molded in the monolithic carrier structure 107. In an example the reservoirs 109 are directly molded by mold protrusions during a compression molding process of the monolithic carrier structure 107. In another example, the reservoirs 109 may be separate rigid cups that are placed onto and/or into the monolithic carrier structure 107, for example by adhering or overmolding techniques.

The digital titration cassette 101 includes an array of fluid dispense devices 111. The array includes two rows of eight fluid dispense devices 111. In the illustrated example, each fluid dispense device 111 is formed by a single fluid dispensing die. In operation the reservoirs 109 receive fluid at the top and the fluid dispense devices 111 are provided at the bottom of the cassette 101. The fluid dispense devices 111 may be overmolded in the carrier structure 107 or adhered to the carrier structure 107. The fluid dispense devices can be provided in the same monolithic carrier structure 107 as the reservoirs 109 or a different carrier structure.

The monolithic carrier structure 107 includes fluid routing 119 to guide fluid from the reservoirs 109 to the fluid dispense devices 111. The fluid routing 119 may include slotted cut outs formed directly in the top surface of the monolithic carrier structure 107. The fluid routing 119 opens into the reservoirs 109 to receive fluid from the reservoirs 109.

The fluid routing 119 includes a main branch 121A that fluidically connects directly to the reservoir 109. The fluid routing 119 includes sub-branches 121B that fluidically connect the main branch 121A to the plurality of fluid dispense devices 111. In the illustrated example, each reservoir 109 connects to a separate fluid routing 119 wherein each separate fluid routing 119 connects to a separate group of fluid dispense devices 111. Each fluid routing 119 branches off in a downstream direction.

Hence, a relatively planar and thin digital titration cassette 101 is provided wherein a relatively dense array of fluid dispense devices 111 may be fed from a smaller number of reservoirs 109. For example, the fluid routing 119 may facilitate denser arrays of fluid dispense devices 111 where a corresponding dense array of reservoirs 109 would become impractical.

In one example, the digital titration cassette 101 includes an array 117 of contact pads 118. The contact pad array 117 is to interface with electrodes of a host apparatus to allow the host apparatus to control drop generators of each fluid dispense device 111. To that end, the cassette 101 includes electrical routing that connects the contact pad array 117 to the plurality of fluid dispense devices 111. Each one contact pad 118 of an array 117 can connect to a plurality of fluid dispense devices 111. Hence, rather than using a separate contact pad array 117 for each fluid dispense device 111, a single contact pad array 117 can be used to signal a plurality of fluid dispense devices 111. For example, a grounded contact pad 118 may be connected to the plurality of fluid dispense devices 111. Another, signaling contact pad 118 may connect to a plurality of fluid dispense devices 111, to signal drop generators to dispense fluid. In an example each signaling contact pad may be at least one of a supply voltage (Vdd), data, clock, etc. Also dummy pads may be provided in the contact pad array 117, that do not connect to a fluid dispense devices 111. In certain examples, certain pads may have a function not directly related to dispensing, for example authentication In an example, one functional contact pad (which function is directly related to dispensing) is connected to a plurality of fluid dispense devices 111. Each functional contact pad 19 may be to conduct one of ground or signals such as supply voltage, data and clock to/from the plurality of fluid dispense devices 11. Again, using relatively few contact pads for a relatively large array fluid dispense devices may facilitate denser and/or larger arrays of fluid dispense devices. In an example, both the number of reservoirs 109 and the number of contact pads 118 of the same function is lower than the number of fluid dispense devices 111.

Figure 3:
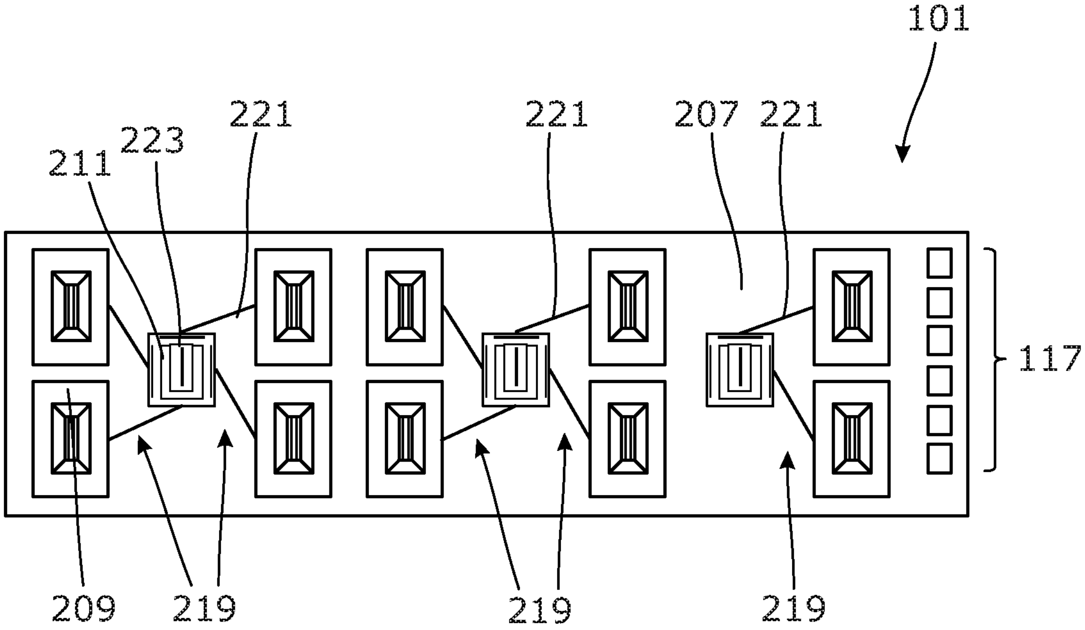
FIG. 3 illustrates a diagram of another example digital titration cassette.

FIG. 3 illustrates an example digital titration cassette 201 of similar structure and materials as FIG. 2, except that in this example there are fewer fluid dispense devices 211 than reservoirs 209. A single die 231 may form the fluid dispense device 211. The digital titration cassette 201 includes ten reservoirs 209 and three fluid dispense devices 211 of an equal number of dies 231, each device 211 being a separate die. Four reservoirs 209 are to provide fluid to one fluid dispense device 211. Two sets of four reservoirs 209 provide fluid to two fluid dispense devices 211. Two further reservoirs 209 are to provide fluid to a third fluid dispense device 211.

Each reservoir 209 provides fluid to the corresponding fluid dispense device 211 through fluid routing 219, whereby multiple fluid routing branches 221 connect to each fluid dispense device 211. Each fluid dispense device may be provided with at least one fluid feed slot 223 that receives the fluid from the multiple branches 221. Starting at the feed slot 223 and going upstream, the fluid routing 219 branches off into separate branches 221 towards each a separate reservoir 209. The electrical contact pad array 217 may be similar to what is described with reference to FIG. 2 above.

A single type of fluid can be distributed over four reservoirs 209 of the same associated fluid ejection device 211. In another example different fluids may be provided in the four reservoirs 209, for example one or two reservoirs 209 may provide a different fluid to the fluid ejection device 211 than the other reservoirs 209. For example a single fluid dispense device 211 may dispense different or pre-mixed fluids.

Figures 4A, 4B, 4C, 4D, 4E, 4F, 4G:
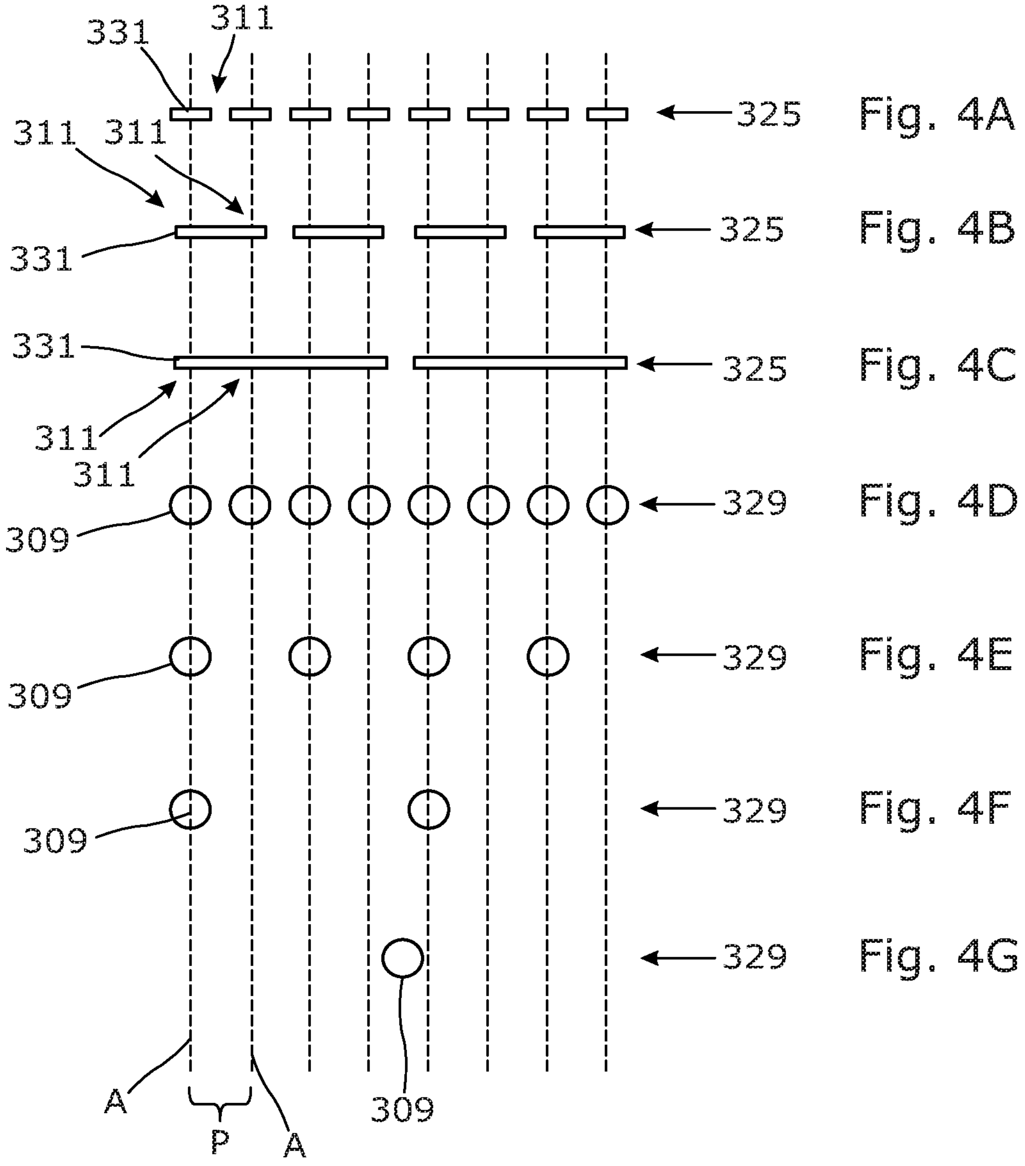
FIG. 4A-4C illustrate diagrammatic examples of different fluid dispense die arrays.
FIG. 4D-4G illustrate diagrammatic examples of different fluid reservoir arrays to connect to the fluid dispense arrays of FIGS. 4A-4C.

FIG. 4A-C illustrate examples of fluid dispense die arrays 325. Each array 325 includes a series of fluid dispense dies 331. Each fluid dispense die 331 includes at least one fluid dispense device 311. For example, each fluid dispense die array 325 of FIGS. 4A, 4B and 4C includes the same number of fluid dispense devices 311, that is arranged within a different number of fluid dispense dies 331. FIG. 4A illustrates an example wherein each fluid dispense device 311 is formed by a separate, single die 331. FIG. 4B illustrates an example wherein a single die 331 includes two fluid dispense devices 311. FIG. 4C illustrates an example wherein each single die 331 includes four fluid dispense devices 311.

FIG. 4D-G illustrate examples of corresponding reservoir arrays 329 that may deliver fluid to each of the fluid dispense devices 311. As indicated with the aid of dotted axes A, the fluid dispense devices 311 of each fluid dispense array 325 of FIGS. 4A-C are provided at the same pitch P as reservoirs 309 of the reservoir array 329 of FIG. 4D. In one example the pitch P is approximately 9 millimeters. In other examples, the pitch P can be a multitude of 0.5 or 0.75 millimeters, wherein said multitude is a discrete number, for example from 1 to 160. The reservoir arrays 329 of FIGS. 4E, F, G each have a two times higher pitch than the reservoir arrays 329 of the Figure above it (FIGS. 4D, E, F, respectively).

In one example, each die 331 of FIGS. 4B and 4C can be fluidically connected to multiple reservoirs 309 of FIG. 4D so that different fluids can be dispensed from a single die into different corresponding wells. The different fluids can be dispensed from different fluid dispense devices 311 in the same die 331, wherein each fluid dispense device 311 is fluidically connected to a single reservoir 309 to dispense a single fluid from a single fluid dispense die 311.

In FIGS. 4A-C, each fluid dispense die 331 has a thickness, width and length wherein the thickness extends into the page, the width extends parallel to the pitch axes A, and the length extends perpendicular to the pitch axes A. The fluid dispense die 331 can be a thin sliver MEMS die, for example having a thickness of approximately 0.5 millimeters or less, 300 micron or less, 200 micron or less or 150 micron or less. The width of each die 331 can be approximately 1 millimeter or less, 0.5 millimeters or less, for example approximately 0.3 millimeters or less. The length of each die 331 may depend on the pitch P and the chosen number of fluid dispense devices 311 that the die 331 incorporates. The pitch P may be aligned with a certain well plate well pitch. For example, where the pitch P of the fluid dispense devices is chosen to be 9 millimeters, the length of each die 331 of FIG. 4A can be approximately 1.5 millimeters or less, the length of each die 331 of FIG. 4B can be approximately 10 millimeters, and the length of each die 331 of FIG. 4C can be approximately 30 millimeters. For example the length of the die can be captured in a formula such as $Ls=(n*P)+m$, wherein Ls is the die length, n is the chosen number of fluid dispense devices that the die incorporates, P is the fluid dispense device pitch (that may be based on a well plate well pitch), and m may be depend on a chosen length of each fluid dispense device. For example, m can be between 0, 2 and 3 millimeters. In turn the chosen length m of the fluid dispense device can depend on the desired length of a nozzle array.

As said, a plurality of fluid dispense devices can be included in one die. A fluid dispense device can be defined by being configured to dispense fluid in a separate well. The contact pad array and electrical routing can be configured to drive each fluid dispense device separately on the same die 431. In one example, a nozzle plate includes regions with nozzle arrays spaced by regions with without nozzles, wherein the nozzle array regions define the fluid dispense devices in the die. In another example a nozzle array may extend uninterruptedly over the length of the die, wherein the electrical routing, software and/or firmware may be configured to activate separate nozzle groups within the larger array for dispensing into separate wells, wherein each nozzle group may define a separate fluid dispense device. In other examples, dummy nozzles may be provided between zones of active nozzles wherein active nozzle regions define the fluid dispense devices.

The thin sliver dies can be adhered to or embedded in a monolithic carrier structure as explained throughout this disclosure. In this disclosure a thin sliver die may include a silicon substrate with at least one thin film layer on top, wherein the die may have a thickness (extending into the page of the drawing) of less than approximately 500 micron, for example less than approximately 300 micron, for example less than approximately 200 micron or for example less than approximately 150 micron. In the absence of sufficient die substrate, the rigid monolithic carrier structure 203 may provide for mechanical support to the thin die.

Fluid routing may extend between each of the reservoirs 309 and each of the fluid dispense devices 311. For example fluid routing may be directly formed in a monolithic carrier that includes the reservoirs 309 and carries the fluid dispense dies 331. In the example of FIG. 4E, each reservoir 309 may fluidically connect to two fluid dispense devices 311, wherein the fluid routing may have two branches to connect to the two fluid dispense devices 311. In the example of FIG. 4F, each reservoir 309 may fluidically connect to four fluid dispense devices 311, wherein the fluid routing may have four branches to connect to the four fluid dispense devices 311. In the example of FIG. 4G, each reservoir 309 may fluidically connect to eight fluid dispense devices 311, wherein the fluid routing may have eight branches to connect to the eight fluid dispense devices 311.

In another example, one fluid dispense die 331 of FIG. 4B includes only one fluid dispense device 311, instead of two. Similarly, one fluid dispense die 331 of FIG. 4C may include only one or two fluid dispense devices 311, instead of four. For example, the reservoir array 329 of FIG. 4D may fluidically route fluid from multiple reservoirs 309 to a single die 331 of FIGS. 4B, C so that two or four reservoirs 309 route fluid to a lesser number of fluid dispense devices 311. In such example, the fluid routing may branch off in an upstream direction to connect multiple reservoirs 309 to a single device 311. The fluid routing can be directly formed in a monolithic carrier that includes the reservoirs 309 and carries the fluid dispense dies 331.

Figure 5:
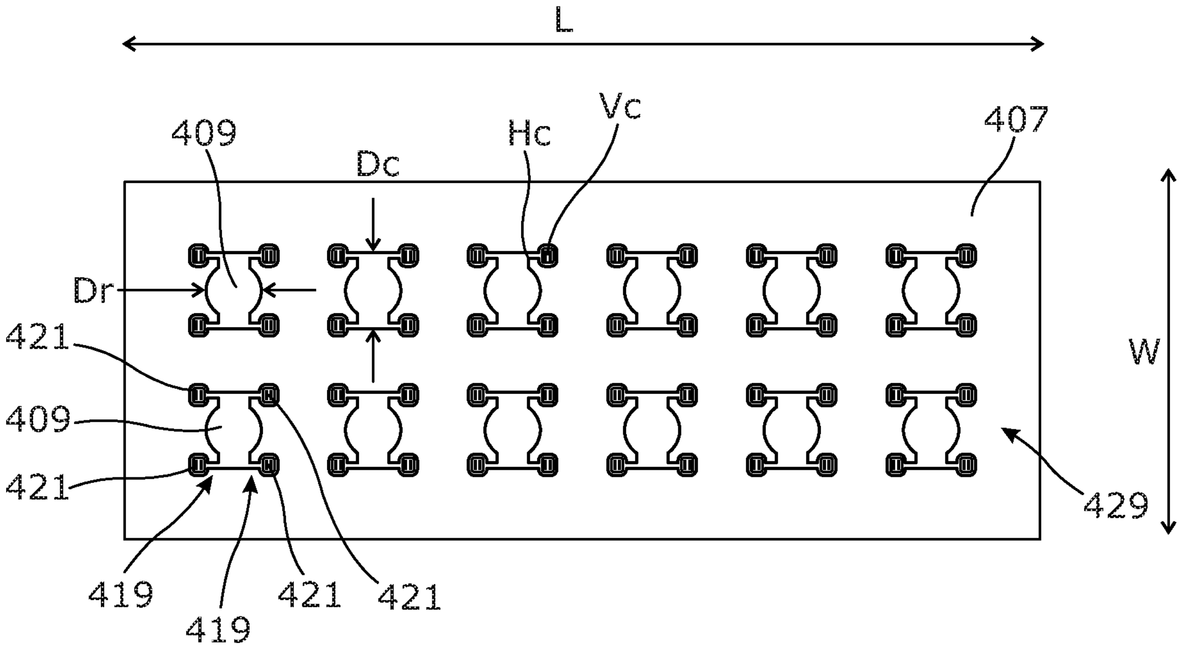
FIG. 5 illustrates an example of a monolithic carrier structure including reservoirs and fluid routing, in top view.
Figure 6:
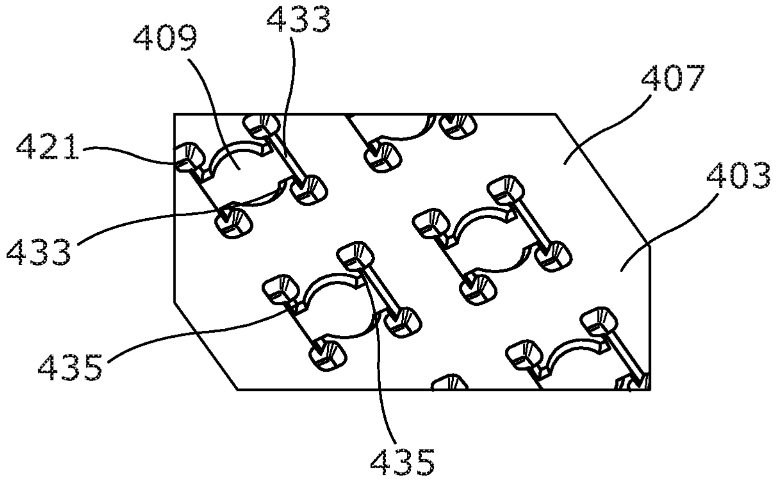
FIG. 6 illustrates a detail of the example monolithic carrier structure of FIG. 5, in perspective view.
Figure 8:
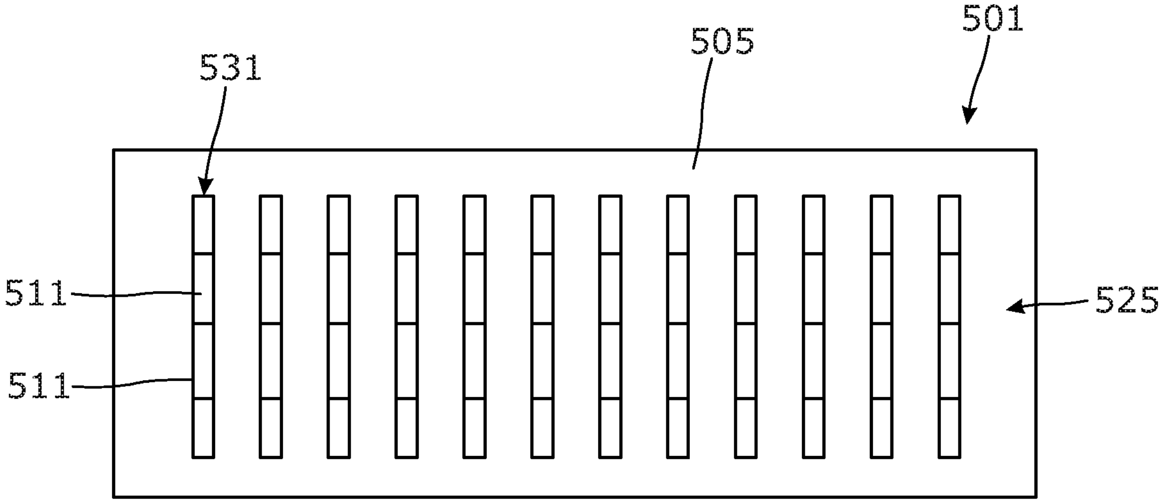
FIG. 8 illustrates a bottom view of the example digital titration cassette of FIG. 7.

FIGS. 5 and 6 illustrate an example of a monolithic carrier 407 that includes a reservoir array 429 of reservoirs 409 wherein fluid routing 419 may extend from each reservoir 409 in the form of four branches 421, to route fluid four fluid dispense devices downstream of the reservoirs 409. FIG. 5 is a top view while FIG. 6 illustrates a detail of FIG. 5 in perspective view. The fluid dispense devices may extend at an opposite side of the monolithic carrier 407. An example of such an opposite side is illustrated in FIG. 8.

The monolithic carrier structure 407 may be a single mold compound structure. The reservoirs 409 and at least part of the fluid routing 410 may have been integrally molded. For example, a single mold protrusion may have shaped the reservoirs 409 and fluid routing branches 421.

Each reservoir 409 may have a relatively shallow depth to facilitate downward flow of fluid from the reservoir 409 to the branches 421 and fluid dispense devices. Each fluid routing branch 421 may protrude through the carrier structure 407 to fluidically connect to each fluid dispense device 411. Each reservoir 409 may have a largest diameter Dr, Dc, as measured along a directions of rows (Dr) or columns Dc of fluid dispense devices, that is almost the same, approximately the same, or more than a pitch of columns or rows, respectively, of fluid dispense devices. The fluid routing branches 421 may extend from a top left, top right, lower left and lower right of each reservoir 409, where a length L of the monolithic structure 407 is oriented parallel or perpendicular to a direction from left to right. In one operational orientation, each fluid routing branch 421 may have a horizontal component Hc to establish flow in a length L and/or width W direction of the carrier structure 407 before extending downward to the fluid dispense device along a vertical component Vc. In operation, fluid may be provided, for example using a pipette, in the reservoir 409, after which fluid may flow partly horizontally and partly downwards through each of the corner branches 421, towards each of the connected fluid dispense devices.

In one example, each reservoir 409 may have reservoir side walls 433 that together with a reservoir bottom form the reservoir 409. The side walls 433 may extend up to a top surface 403 of the monolithic carrier structure 403, or in certain examples the walls 433 could protrude out of the general top surface 403 of the carrier structure 403 up to a higher point. The side walls 433 include apertures that form ports 435 to the fluid routing branches 421. The fluid routing 419 extends deeper in to the carrier structure 407 than the reservoir bottom to facilitate gravitational flow out of the reservoir 409 to the fluid dispense devices.

Figure 7:
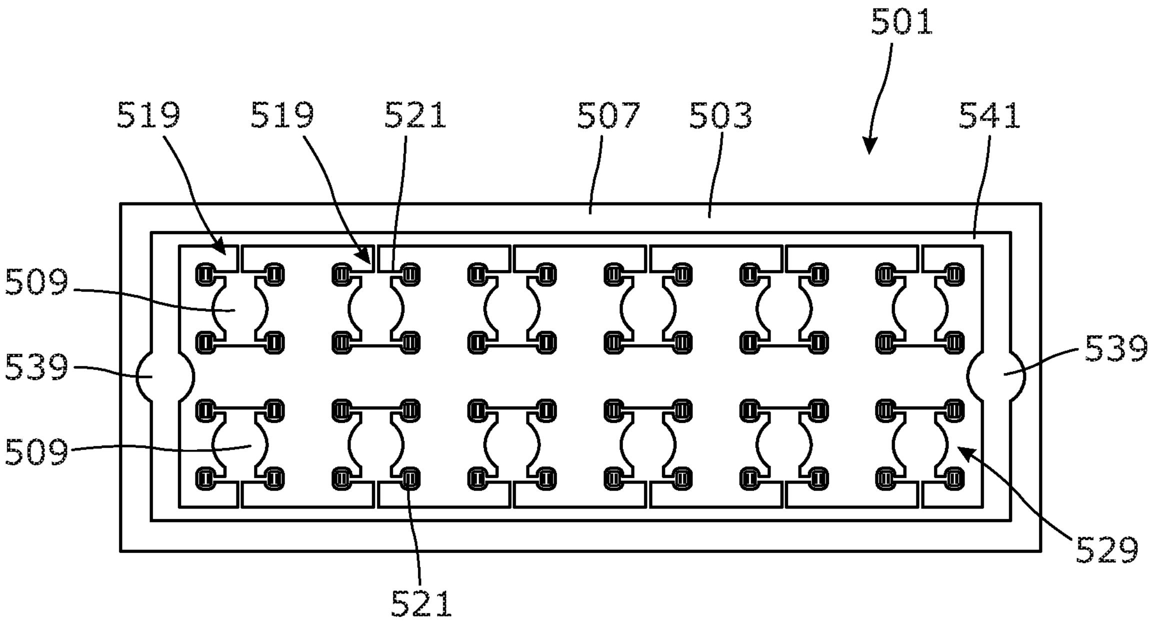
FIG. 7 illustrates an example of a digital titration cassette, in top view.

FIG. 7 illustrates an example of a digital titration cassette 501 including a monolithic carrier structure 507. The carrier structure 507 includes a first reservoir array 529 and fluid routing branches 521 downstream of the reservoirs 509 that are similar to the reservoir arrays and fluid routing to FIGS. 5 and 6. The monolithic carrier structure 507 further includes second reservoirs 539 and fluid routing 541 upstream of the reservoirs 509. The second fluid routing 541 may be fluidically connected to all first reservoirs 509 and first fluid routing branches 521. For example the second fluid routing 541 extends along the width and length of the monolithic carrier structure 507 along multiple first reservoirs 509, for example along a complete row and/or complete column of first reservoirs 509. For example the second fluid routing 541 extends along the edges of the carrier structure 507. The second fluid routing 541 may be a cut out in the surface 503 of the monolithic carrier structure 507. Widening portions of the second fluid routing 541 may facilitate manual fluid entry, for example from a pipette or syringe, functioning as said second fluid reservoirs 539.

In the illustrated example, the first reservoirs 509 may function as junctions and/or buffers to branch off the fluid towards four fluid dispense devices. In fact, in the illustrated examples the first reservoirs form part of the fluid routing. As mentioned earlier in this disclosure the reservoirs and fluid routing may be formed by an integral cut out in the carrier structure. A reservoir and associated fluid routing may be integral or flush with respect to each other, or may be recognizable as discrete components. In one example a reservoir is recognizable as being a wider part of the rest of the fluid routing, to facilitate fluid reception.

FIG. 8 illustrates a bottom view of the digital titration cassette 501 of FIG. 7. A fluid dispense die array 525 is provided in a bottom side 505 of the cassette 501. The fluid dispense die array 525 may fluidically connect to the fluid routing 419, 519 of FIGS. 5-7, downstream of the fluid routings 419, 519. The sub-branches 421, 521 of each first reservoir 409, 509 provide fluid to these fluid dispense devices 511. In the illustrated example each column of downward flow fluid branches 521 is connected to fluid dispense devices 511 of a single die 531.

Figure 9:
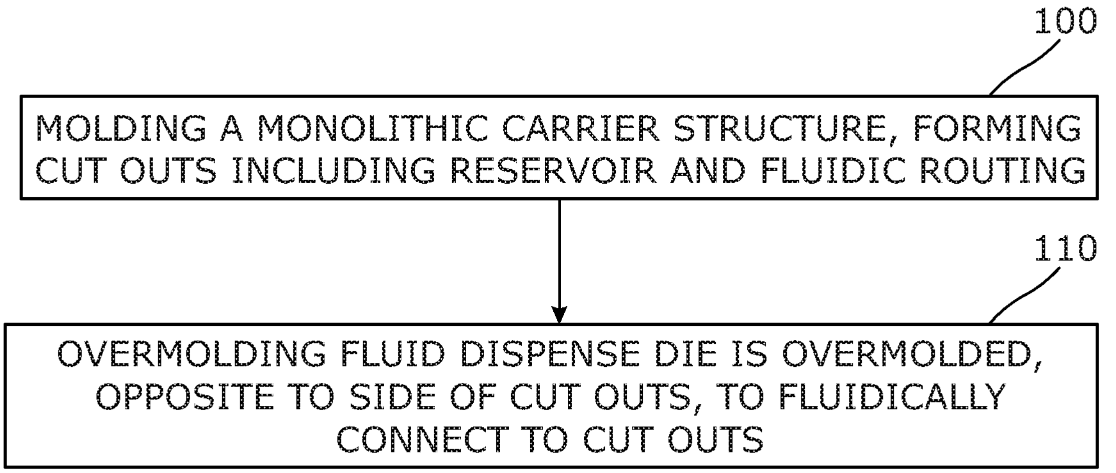
FIG. 9 illustrates an example of a method of manufacturing a digital titration cassette.

FIG. 9 illustrates an example of a method of manufacturing a digital titration cassette. The method includes molding a monolithic compound carrier structure while forming cut outs into a top surface of the carrier structure (block 100), the cut outs including at least one reservoir extending into part of the thickness of the carrier structure and fluid routing to fluidically connect the reservoir with at least one fluid dispense die. For example the molding includes compression molding and the mold includes mold protrusions that protrude into the molded compound to form the fluid routing. The method further includes overmolding at least one fluid dispense die into the monolithic compound carrier structure at a side of the monolithic compound carrier structure that is opposite to the cut outs, to fluidically connect the die to the cut outs (block 110).

Figure 10:
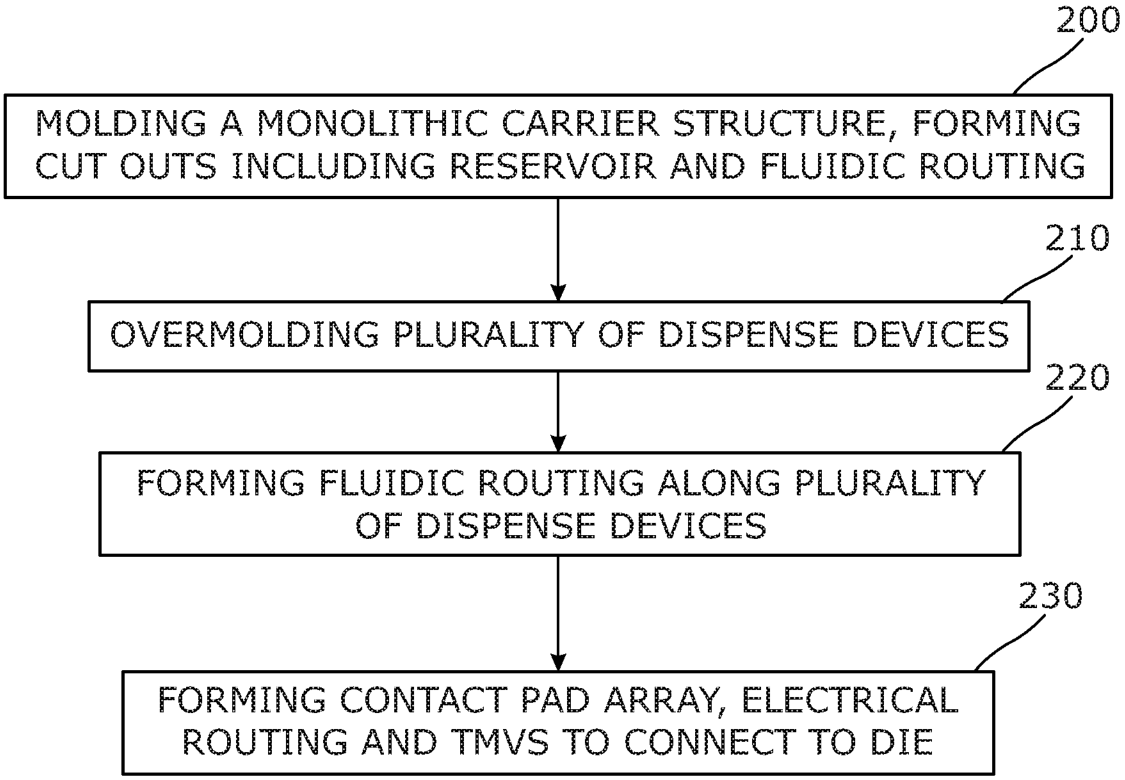
FIG. 10 illustrates another example of a method of manufacturing a digital titration cassette.

FIG. 10 illustrates another example of a method of manufacturing a digital titration cassette. The method includes molding a monolithic compound carrier structure while forming cut outs into a top surface of the carrier structure (block 200), the cut outs including at least one reservoir extending into part of the thickness of the carrier structure and fluid routing to connect the reservoir with at least one fluid dispense die. The method further includes overmolding a plurality of fluid dispense devices in a plane, at a side of the monolithic compound carrier structure that is opposite to the side of the cut outs, to fluidically connect the devices to the cut outs (block 210). The plurality of fluid dispense devices may be included in a single die or in multiple dies. The method further includes molding the fluid routing in the monolithic carrier structure to extend along the plurality of fluid dispense devices (block 220), to fluidically connect to the plurality of fluid dispense devices. The method may further include depositing electrical routing on the monolithic carrier structure (block 240).

In certain example of this disclosure electrical routing connects the fluid dispense devices to the contact pad array. In different examples, the electrical routing can be disposed using MID (molded interconnect device) and/or LDS (laser direct structuring) technology, and/or flexible circuitry adhered to or embedded in the carrier structure. In another example the electrical routing can be provided on a separate PCB (printed circuit board) adhered to or embedded in the carrier structure. Part of the electrical routing may extend through the monolithic carrier structure, for example to connect the contact pads on the top to fluid dispense dies on the bottom. Suitable techniques such as soldering and/or wire bonding may be applied between the die contact pads, vias and the rest of the electrical routing.

In certain examples of this disclosure the pitch of the fluid dispense devices is aligned with a pitch of wells in existing well plates so that an array of fluid dispense devices is aligned with an array of wells, during titration. For example, certain well pitches of existing well plates are 750 micron and 9 millimeters. Accordingly, the pitch of fluid dispense devices can be 9 millimeters or a multitude of 750 micron. In the examples of this disclosure, the pitch of reservoirs in one row of reservoirs can be a discrete number times the pitch of fluid dispense devices in one row. For example where the pitch of the fluid dispense devices is 750 micron or a multitude thereof, for example 1.5 or 3 millimeter, the pitch of the reservoirs may be a discrete number times that pitch, for example 0.75, 1.5, 3, 6, 12 millimeters, etc. Fluid routing can be provided to route fluid from one reservoir to a plurality of fluid dispense devices.

The different dispense apparatus described in this disclosure may be relatively planar. With "planar" it may be understood that the array 1 has a thickness T (e.g. see FIG. 1) that is at least three times or at least five times less than a width of the dispense apparatus. In FIG. 1 the width extends into the page. The length L of the dispense apparatus may be more than the width wherein the length and width of the array may form the central plane P along which the planar monolithic carrier structure extends. For example, a total length of the cassette may be between approximately 50 and 300 millimeters, for example approximately 100 millimeters, and a total width may be between approximately 15 and approximately 200 millimeters, for example approximately 35 millimeters, not counting a protruding grip for gripping the cassette (where present), or for example approximately 20 millimeters longer including the grip. A maximum thickness of such dispense apparatus, between a top side and a bottom side, could be less than 10 millimeters, for example less than 6 millimeters, for example less than 5 millimeters, for example approximately 4 millimeters.

One of the aspects of this disclosure is about using one monolithic carrier structure or a plurality of parallel monolithic carrier structures that each carry relatively large arrays of components such as fluid passages, fluid devices, electrical routing, etc.

In an example, each reservoir and fluid routing of this disclosure is shaped to hold fluid volumes of approximately 200 microliter or less, approximately 100 microliter or less, approximately 50 microliter or less or approximately 20 microliter or less per fluid dispense device.

Each fluid dispense device of this disclosure can be composed of, or part of, a thin sliver die. A thin sliver die may have a thickness of approximately 0.5 millimeters or less, 300 micron or less, 200 micron or less or 150 micron or less. The width of each die can be approximately 1 millimeter or less, 0.5 millimeters or less, for example approximately 0.3 millimeters. The length of each die may depend on the pitch and the chosen number of fluid dispense devices it incorporates. For example the length of the die can be between approximately 1 and 80 millimeters.

The fluid dispense die technology may be leveraged from inkjet printhead technology, for example piezo or thermal inkjet technology. In different examples of this disclosure, a number of fluid dispensing nozzles per fluid dispense device may vary from 1 nozzle to approximately 1000 nozzles, for example between 5 and 600 nozzles, for example approximately 100 nozzles, not counting dummy nozzles or sensing nozzles, if any.

In the examples of this disclosures, fluid flow actuators may include thermal actuators or piezo actuators. These actuators form part of the die. The dispense apparatus may be void of other fluid flow actuators outside of the die. For example, fluid flow may be established by at least one of fluid actuators, gravity, and capillary forces. No further proactive backpressure regulation needs to be provided. For example, no further filter, no capillary media, etc. is provided in the digital titration cassette.

Although this disclosure has mostly addressed digital titration cassettes, the disclosed features can apply to any digital dispense apparatus having similar features and should not be interpreted as limiting to titration applications only.

The invention claimed is:

1. A method of manufacturing a digital dispense apparatus, comprising: molding a monolithic carrier structure;

forming cut outs into a planar top surface of the monolithic carrier structure, the cut outs including a reservoir extending into part of a thickness of the monolithic carrier structure and fluid routing to connect the reservoir with a fluid dispense device, the fluid routing including fluid routing walls defined by slotted cut outs of the monolithic carrier structure; and overmolding the fluid dispense device into the monolithic carrier structure on a side of the monolithic carrier structure that is opposite to the reservoir to fluidically connect to the fluid routing.

2. The method of claim 1, comprises:

overmolding a plurality of fluid dispense devices in an array in a plane, wherein the plurality of fluid dispense devices includes the fluid dispense device; and shaping the fluid routing to cover a distance of the plurality of fluid dispense devices.

3. The method of claim 2, comprising:

forming a contact pad array next to the reservoir;

forming electrical routing on the monolithic carrier structure; and forming through mold vias (TMVs) through the monolithic carrier structure to connect the contact pad array to the fluid dispense device.

4. The method of claim 1, wherein forming the cut outs comprises:

forming the reservoir that includes a first surface recessed relative to the planar top surface of the monolithic carrier structure and a plurality of side walls defined by the monolithic carrier structure; and forming the fluid routing that includes a second surface recessed relative to the planar top surface and relative to the first surface, the fluid routing including fluid routing walls defined by slotted cut outs of the monolithic carrier structure.

5. The method of claim 4, wherein the fluid routing fluidically connects the reservoir and the fluid dispense device, and the fluid dispense device includes a drop generator comprising a nozzle, a nozzle chamber, and a drop ejection actuator in the nozzle chamber.

6. The method of claim 1, wherein forming the cut outs comprises forming a number of reservoirs extending into part of the thickness of the monolithic carrier structure and fluid routing to connect the number of reservoirs with the fluid dispense device, the number of reservoirs including the reservoir.

7. The method of claim 1, wherein:

forming the cut outs comprises forming a first number of reservoirs extending into part of the thickness of the monolithic carrier structure and fluid routing to connect the first number of reservoirs with a second number of fluid dispense devices, the first number of reservoirs including the reservoir and the second number of fluid dispense devices including the fluid dispense device; and overmolding the fluid device comprises overmolding the second number of fluid dispense devices into the monolithic carrier structure on the side of the monolithic carrier structure that is opposite to the first number of reservoirs to fluidically connect to the fluid routing.

8. The method of claim 7, wherein overmolding the second number of fluid dispense devices comprises fluidically connecting subsets of the first number of plurality of reservoirs to each one of the second number of fluid dispense devices.

9. The method of claim 1, wherein:

forming the cut outs comprises forming the reservoir and fluid routing to connect the reservoir with a number of fluid dispense devices, the number of fluid dispense devices including the fluid dispense device; and overmolding the fluid dispense device comprises overmolding the number of fluid dispense devices into the monolithic carrier structure on the side of the monolithic carrier structure that is opposite to the reservoir to fluidically connect to the fluid routing.

10. A method of manufacturing a digital dispense device, comprising:

molding a monolithic carrier structure;

forming cut outs into a planar top surface of the monolithic carrier structure, the cut outs including a first number of reservoirs extending into part of a thickness of the monolithic carrier structure and fluid routing to connect the first number of reservoirs with a second number of fluid dispense devices, the first number being different than the second number; and overmolding the second number of fluid dispense devices into the monolithic carrier structure on a side of the monolithic carrier structure that is opposite to the first number of reservoirs to fluidically connect to the fluid routing, wherein the fluid routing branches off.

11. The method of claim 10, wherein the overmolding the second number of fluid dispense devices into the monolithic carrier structure comprises fluidically connecting each of the first number of reservoirs to a subset of the second number of fluid dispense devices, wherein the first number is smaller than the second number.

12. The method of claim 10, wherein overmolding the second number of fluid dispense devices into the monolithic carrier structure comprises fluidically connecting subsets of the first number of reservoirs to a respective one of the second number of fluid dispense devices, wherein the first number is larger than the second number.

13. The method of claim 10, wherein forming the cut outs comprises forming the fluid routing such that the fluid routing branches off in a downstream direction to guide fluid received from one of the first number of reservoirs to a plurality of the second number of fluid dispense devices.

* * * * *